No. 655,474. Patented Aug. 7, 1900.
G. S. BLAKESLEE.
DISH WASHING MACHINE.
(Application filed Mar. 23, 1898.)

(No Model.) 3 Sheets—Sheet 3.

Witnesses: Inventor:
George S. Blakeslee,
By Bond Adams Pickard Jackson
Att'ys

THE NORRIS PETERS CO., PHOTO-LITHO., WASHINGTON, D. C.

UNITED STATES PATENT OFFICE.

GEORGE S. BLAKESLEE, OF CHICAGO, ILLINOIS.

DISH-WASHING MACHINE.

SPECIFICATION forming part of Letters Patent No. 655,474, dated August 7, 1900.

Application filed March 23, 1898. Serial No. 674,856. (No model.)

*To all whom it may concern:*

Be it known that I, GEORGE S. BLAKESLEE, a citizen of the United States, residing at Chicago, in the county of Cook and State of Illinois, have invented certain new and useful Improvements in Dish-Washing Machines, of which the following is a specification, reference being had to the accompanying drawings.

My invention relates to dish-washing machines, and has for its object to provide an improved machine of this character in which the water will be effectually caused to circulate through the dishes for the purpose of cleansing them.

To this end my invention consists, generically, in providing a tank with a dish-holding receptacle or basket and providing means for rotating the tank while the basket remains stationary.

That which I regard as new will be set forth in the claims.

Figure 1:
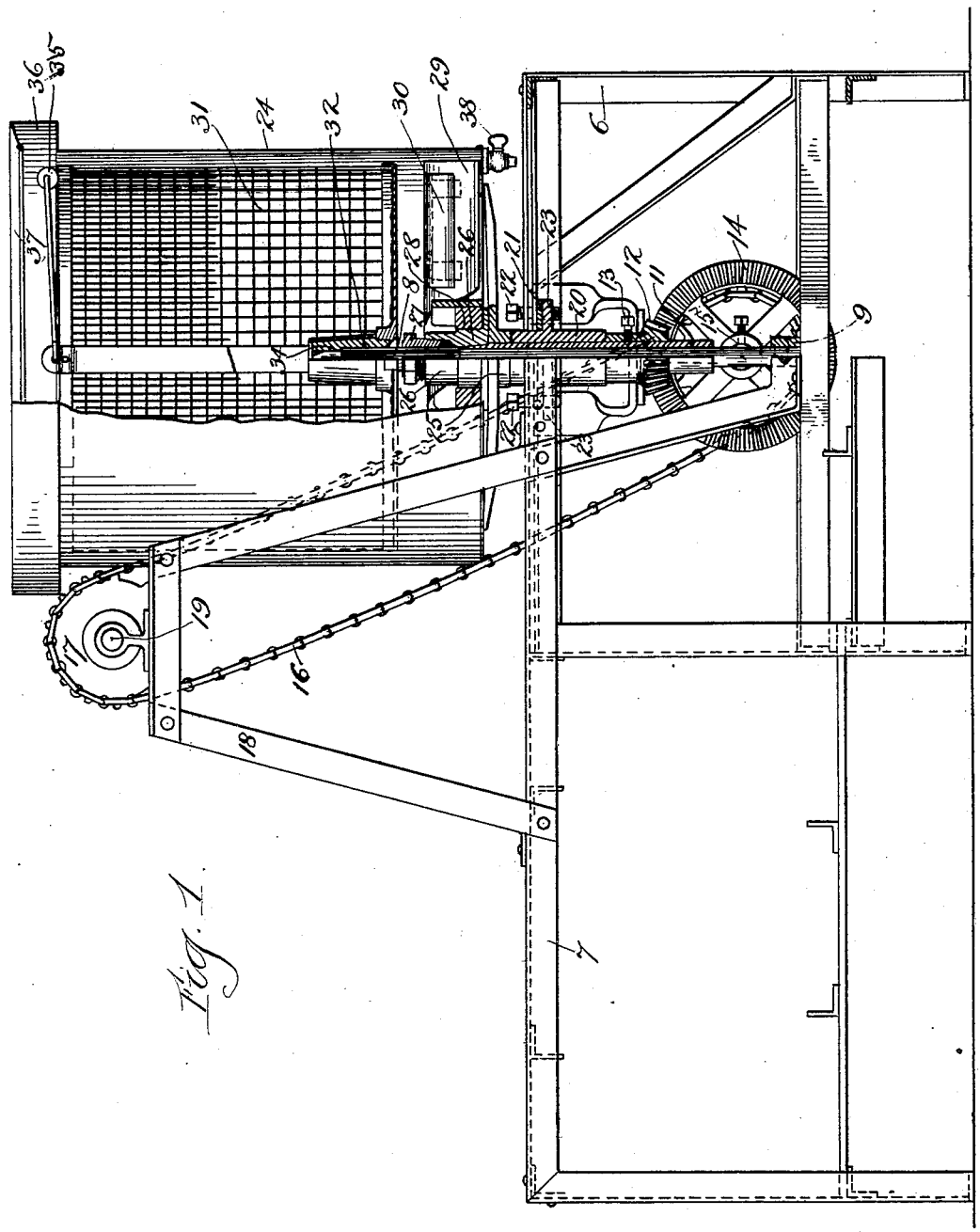
Figure 2:
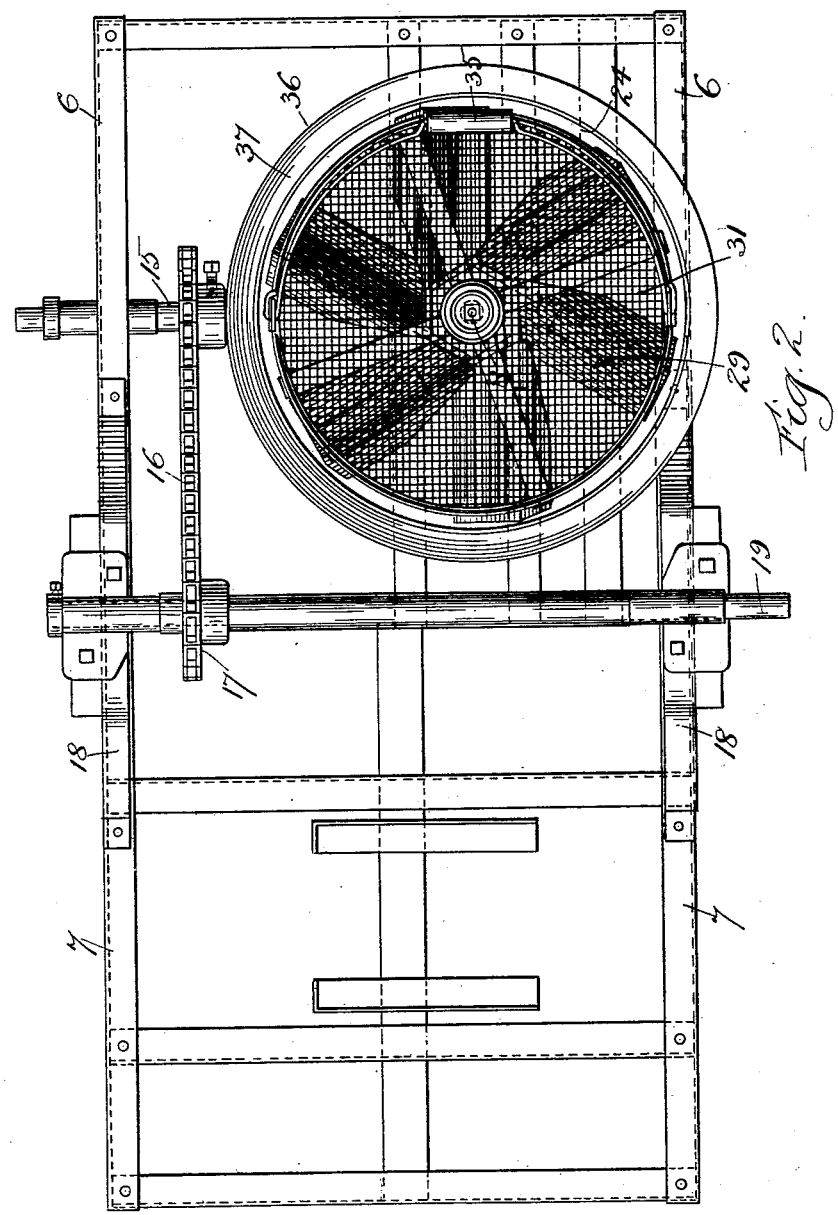
Figure 3:
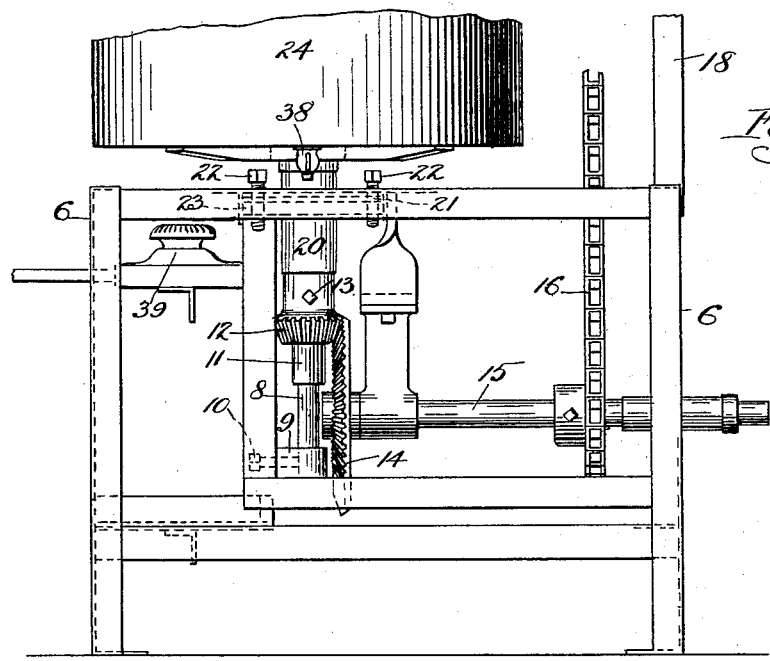
Figures 4, 5, 6:
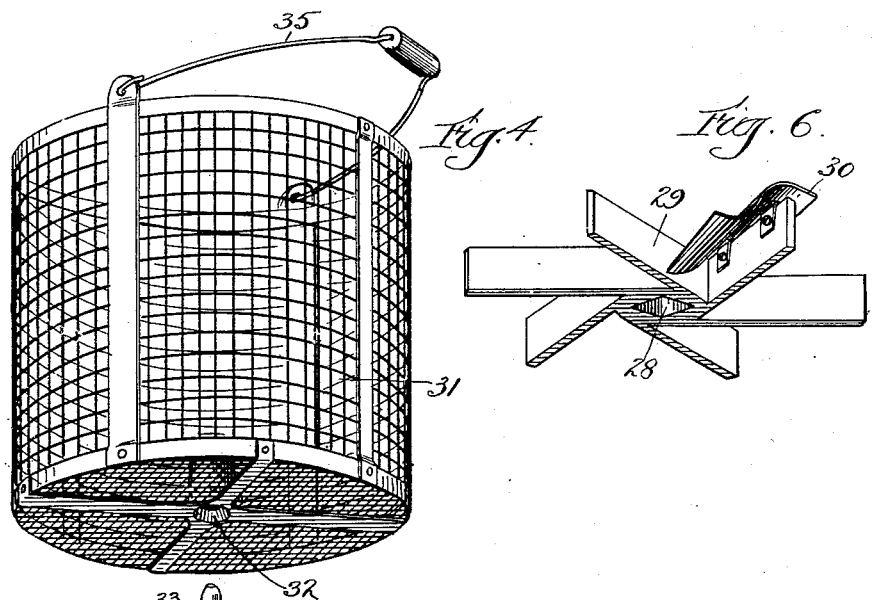

In the accompanying drawings, Figure 1 is a side elevation, part of the tank being broken away and certain parts being in section. Fig. 2 is a plan view. Fig. 3 is an end view showing a part of the tank. Fig. 4 is a perspective view of the dish-holding basket. Fig. 5 is a similar view of the spindle which supports the basket, and Fig. 6 is a perspective view of the agitating devices.

Referring to the accompanying drawings, 6 indicates a frame of suitable construction to support the mechanism.

7 indicates an extension of the frame 6, adapted to hold a tank of water for rinsing purposes. This extension-frame may, however, be omitted, if desired.

8 indicates a spindle which is secured at its lower end in a suitable bracket 9, carried by the frame 6, and extends up beyond the frame, as shown in Fig. 1. A set-screw 10 serves to secure the lower end of the spindle rigidly in place.

11 indicates a sleeve which is mounted on the spindle 8, as shown in Figs. 1 and 3. The upper end of the sleeve 11 is tapered for a purpose which will be hereinafter stated. The sleeve 11 is adapted to rotate upon the spindle 8, and to secure such rotation it is provided with a pinion 12, which is mounted thereupon near its lower end and secured thereto by a set-screw 13, as shown in Fig. 1. The pinion 12 meshes with a gear 14, mounted upon a shaft 15, suitably supported in the frame of the machine and adapted to be driven either directly by a crank applied to one end or by a link belt 16, as shown in the drawings. In the construction shown in Fig. 1 the link belt 16 passes over a sprocket-wheel 17, mounted upon a suitable support 18. The sprocket-wheel 17 is adapted to be rotated by a crank applied to its shaft 19.

20 indicates a stationary sleeve which is mounted upon the sleeve 11 above the pinion 12 and is secured to supporting-bars 21 by bolts 22, which pass through said bars and through a flange 23, which projects from said sleeve 20. The sleeve 20 serves to carry the weight of the superposed apparatus.

24 indicates a water-tank which is adapted to be fitted over the spindle 8 and to rest upon the upper end of the sleeve 20.

25 indicates a bracket secured to the bottom of the tank 24, which bracket forms the lower bearing for said tank. To prevent leakage from the tank around the spindle 8, it is provided with a stuffing-box 26, which is adapted to fit snugly over the tapered end of the sleeve 11 and to rest upon the bottom of the tank. It is provided with a gland 27, which fits around the upper end of the spindle 8, so that a tight box is formed, preventing leakage. As shown in Fig. 5, the outer lower portion of the stuffing-box 26 is squared, so that it is adapted to receive the squared opening 28 of an agitator 29, which fits down over it and is thereby caused to rotate with the tank. For the purpose of causing the tank to rotate it is keyed to or otherwise suitably connected with the sleeve 11.

30 indicates a deflector which is carried by one of the arms of the agitator 29 and serves to direct the water upward as the agitator rotates.

31 indicates a dish-holding basket provided with a central bearing 32, which is adapted to fit over the upper end of the spindle 8 and to be supported thereby a short distance above the gland 27. For supporting the basket the upper end of the spindle 8 is provided with a shoulder 33 and the upper portion of the bearing 32 is provided with a corresponding shoulder 34, so that when the basket is in place the shoulder 34 rests upon the shoulder 33, preventing the basket from descending farther.

As illustrated in Fig. 1, the basket is slightly less in diameter than the tank and is constructed of netting or other open-work, so that the water may readily pass through its sides, and is provided with a handle 35, by which it may be handled.

36 indicates an annular channel at the upper end of the tank 24, which channel is provided with a deflector 37, arranged to deflect the water thrown up into the channel back into the tank.

38 indicates a cock for discharging the water from the tank.

39 indicates a lamp placed under the tank for the purpose of heating the water therein.

The operation of my improved dish-washer is as follows: The tank having been partly filled with water properly heated, the dishes are placed in the basket 31 and the basket is placed in the tank. The tank is then caused to rotate by rotating the shaft 19, the water within the tank being thereby caused to rise by centrifugal action around the sides of the tank, whence it is discharged through the meshes of the basket upon the dishes, the basket in the meantime remaining stationary. The agitator 29 rotating with the tank causes the more effective distribution of the water throughout the dishes in the basket. When the dishes have been properly washed, the tank is stopped and the basket removed and dipped into a tank of rinsing-water.

While in the embodiment of my invention herein illustrated and described the basket is arranged to remain stationary while the tank revolves, this arrangement may be modified by providing for rotating the basket at a slower rate than the tank, and my invention includes such arrangement. Furthermore, while my improvements are more especially designed for machines to be used in washing dishes they may also be used for washing other articles, and my invention is therefore not limited to dish-washing machines alone.

While I have described my invention in detail, I do not wish to be limited to the specific construction shown and described except as specifically claimed, as various modifications may be made without departing from my invention.

That which I claim as my invention, and desire to secure by Letters Patent, is—

1. In a washing-machine, the combination with a tank, of a stationary spindle projecting into said tank, a basket carried by said spindle, and means for rotating said tank, substantially as described.

2. In a washing-machine, the combination with a tank, of a stationary spindle projecting into said tank, a stuffing-box around said spindle, and a basket mounted on said spindle, substantially as described.

3. In a washing-machine, the combination with a tank, of a stationary spindle projecting thereinto, a basket supported upon said spindle, a stuffing-box around said spindle, and means for rotating said tank upon said spindle, substantially as described.

4. In a washing-machine, the combination with a tank, of a stationary spindle projecting thereinto, a basket supported on said spindle, a sleeve connected to said tank, and means for rotating said sleeve, substantially as described.

5. In a washing-machine, the combination with a tank, of a stationary spindle projecting thereinto, a basket supported on said spindle, a sleeve connected to said tank, means for rotating said sleeve, and an external sleeve supporting said rotary sleeve, substantially as described.

6. In a washing-machine, the combination with a tank, of a stationary spindle projecting thereinto, a stuffing-box, a basket, means for supporting said basket above and out of contact with the stuffing-box, and means for rotating said tank, substantially as described.

GEORGE S. BLAKESLEE.

Witnesses:
ALBERT H. ADAMS,
HOLMES A. TILDEN.